United States Patent Office 2,961,365
Patented Nov. 22, 1960

2,961,365

LAMINATION OF POLYETHYLENE TEREPHTHALATE STRUCTURES

Cyrus Efrem Sroog, Grand Island, N.Y., assignor to E. I. du Pont de Nemours and Company, Wilmington, Del., a corporation of Delaware No Drawing. Filed Oct. 13, 1954, Ser. No. 462,099

8 Claims. (Cl. 154—139)

This invention relates to laminations comprising polymeric linear terephthalate structures, and, more particularly, to laminations of polyethylene terephthalate film to itself or other base materials with an intermediate adhesive layer comprising a polyester.

The preparation of the novel class of film- and fiber-forming linear polyesters of terephthalic acid and a glycol of the series of $HO(CH_2)_nOH$ where "$n$" is an integer from 2–10, inclusive, is fully disclosed in United States Patent No. 2,465,319 to Whinfield and Dickson. From a commercial standpoint, one of the most attractive polymers of this class is polyethylene terephthalate; and the most promising process for its production comprises carrying out an ester interchange between ethylene glycol and dimethyl terephthalate to form bis-2-hydroxy ethyl terephthalate monomer which is polymerized to polyethylene terephthalate under reduced pressure and at elevated temperatures.

Oriented, heat-set polyethylene terephthalate film, e.g., film which has been stretched to substantially the same extent in both directions and heat-set at temperatures in the neighborhood of 200° C. under tension, is a highly versatile material because of its balanced physical properties, excellent electrical properties and outstanding resistance to chemical degradation. The film may be employed as a dielectric in a wide variety of electrical applications, e.g., insulation in motors, transformers, wires and cables, capacitors, etc. Furthermore, the film is highly useful for such applications as sound recording tape, as a plastic glazing material, as a protective covering for thermal insulation, sound insulation, etc., as a material of construction for transparent containers, piping, bottle closures, and as a versatile packaging material.

Although polyethylene terephthalate film may be employed as the sole structural material in a great variety of end uses, its usefulness as a structural material in laminations to itself and other base materials is of tremendous importance. In laminations to itself and other base materials, the field of end uses for this material is practically unlimited. Other base materials to which polyethylene terephthalate may be laminated to form useful structures include the following types of base materials usually in the form of films, fabrics, sheets and coatings; woven fabrics of natural and/or synthetic fibers, fibrous non-woven structures such as paper (e.g., asphalt paper) and cardboard; metal sheets such as aluminum and steel; block plate such as tin plate or steel; leather; wood, particularly plywood or composition board; polymers such as polyethylene, polyvinyl chloride, and copolymers thereof (particularly plasticized polymers), polyvinylidene chloride and copolymers thereof; rubber and synthetic rubber; cellular structures such as cellular polystyrene and cellular cellulose acetate; woven and non-woven sheets of glass fibers; masonry structures such as cement block or cinder block; glass, etc.

An object of the present invention is to provide laminations of polymeric linear terephthalate ester structures, e.g., films and fabrics, to a second layer of material. A further object of the present invention is to provide adhesive compositions suitable for bonding polyethylene terephthalate structures to a second base material. A further object is to provide a lamination of polyethylene terephthalate film to itself. A still further object is to provide a lamination of polyethylene terephthalate film to itself, the lamination remaining structurally sound at elevated temperatures. Other objects will be apparent from the following description of the invention.

The above objects are accomplished in accordance with the present invention which, in brief, comprises providing a laminated structure of a polymeric linear terephthalate ester structure and a second layer, said layers being adhered together with an intermediate adhesive layer, said adhesive layer comprising a polyester obtainable by reacting a polymethylene glycol having from 2–10 carbon atoms per molecule with a dicarboxylic acid from the group consisting of isophthalic acid, hexahydro-terephthalic acid, a mixture of terephthalic acid and isophthalic acid, a mixture of terephthalic acid and hexahydro-terephthalic acid, a mixture of isophthalic acid and hexahydro-terephthalic acid, and a mixture of terephthalic acid, isophthalic acid and hexahydro-terephthalic acid.

While the invention will be described and illustrated with specific reference to polyethylene terephthalate, it is to be understood that the term "polymeric linear terepthalate ester" includes polymerization products obtained from reacting a glycol of the series $HO(CH_2)_nOH$ where "$n$" is an integer from 2–10, inclusive, and terephthalic acid or a low alkyl ester thereof.

The term "polymeric linear terephthalate ester structures" refers to films and woven or non-woven fabrics of the subject polyesters.

The term "second layer" is meant to include materials which are usually in the form of sheets, thin films, and woven or non-woven fabrics including metals, glass, thermosetting and thermoplastic polymers including polyethylene terephthalate itself, wood, paper, leather, etc.

As defined above, the adhesive layer is a polyester, which may or may not contain a terephthalate component. For example, the adhesive layer may be polyethylene isophthalate or polyethylene hexahydro-terephthalate; or it may be a copolyester of ethylene terephthalate/ethylene isophthalate, or a copolyester of ethylene terephthalate/ethylene hexahydro-terephthalate, or a copolyester of ethylene isophthalate and ethylene hexahydro-terephthalate, or a copolyester of ethylene terephthalate, ethylene isophthalate and ethylene hexahydro-terephthalate.

All of the polyesters which may be employed as the adhesive layer in the present invention are obtainable by reacting a polymethylene glycol having from 2–10 carbon atoms per molecule with one or more of the specified dicarboxylic acids, under polyester-forming conditions well known in the art. On the other hand, it is preferred to prepare the polyester adhesives by carrying out an ester interchange reaction between a glycol and a dialkyl ester of the acid(s) to be reacted. Subsequently, the product of ester interchange is heated at elevated temperatures and reduced pressures to form the polyester having the desired viscosity (molecular weight).

The present polyester adhesive compositons should have an intrinsic viscosity of at least about 0.4. As used herein, intrinsic viscosity, denoted by the symbol $(n)_0$, is a measure of the degree of polymerization of a polyester and may be defined as:

$$\text{limit of } \frac{\ln (n)_r}{C} \text{ as } C \text{ approaches } 0$$

wherein $(n)_r$ is the viscosity of a dilute phenol-tetrachloroethane (60/40) solution of the polyester divided by the viscosity of the phenol-tetrachloroethane mixture per se measured in the same units at the same temperature and C is the concentration in grams of polyester per 100 cc. of solution.

For the purpose of illustrating a typical preparation of a copolyester adhesive of ethylene terephthalate/ethylene isophthalate, the following is presented. Hereinafter, the particular ratio of terephthalate component to isophthalate component or hexahydro-terephthalate component will be expressed in terms of the molar ratios of the acids or alkyl esters thereof in the initial reactants. For example, an 80/20 terephthalate/isophthalate copolyester is one wherein the mol percent of dimethyl terephthalate in the initial reactants was 80%, based upon the total mols of dimethyl terephthalate and dimethyl isophthalate in the initial reactants.

The following example illustrates a typical preparation of an 80/20 terephthalate/isophthalate polyester.

Dimethyl terephthalate (16 parts) and dimethyl isophthalate (4 parts) were placed into a reaction vessel fitted with a nitrogen inlet and a condenser. Ethylene glycol (20 parts) containing 0.0012 part of lithium hydride and 0.007 part of zinc acetate dihydrate was added to the reaction vessel, and the mixture was warmed up slowly until no more methanol distilled over. At this point, 0.006 part of antimony trioxide was added. A very low stream of nitrogen was injected into the vessel. The temperature of the vessel was then raised to about 286° C. and when most of the glycol had been driven off at atmospheric pressure, the pressure in the vessel was gradually reduced. A period of about 1 hour was required to reduce the pressure in the vessel to 0.2 to 0.5 mm. of mercury at which pressure the polymerization was completed. The reaction was completed when the intrinsic viscosity of the polymer reached about 0.6.

The polyester adhesive layer in the laminations of the present invention may be applied to the layer of polymeric linear terephthalate ester or to the second layer, or to both from solvent solutions of the copolyester which may be applied to the layers by spraying, brushing, dipping or other coating techniques. Normally, it is preferred (although it is not necessary) to drive off the solvent from the adhesive layer so that this layer is in the form of a substantially homogeneous coating upon one or the other or both of the layers to be laminated together. Lamination may then be carried out conveniently by applying heat and pressure to the composite structure, thereby softening the adhesive layer and producing a strong bond between the layer of polymeric linear terepththalate ester and a second layer. An alternative procedure involves forming preformed homogeneous thin films of the adhesive polyester layer by casting the films upon a surface from which they may be readily stripped, the cast films being formed from solvent solutions of the polyester or from hot melts of the polyester adhesive. After formation and solidification of the polyester adhesive layer in the form of thin films, these films may be then interposed between polymeric linear terephthalate films or fabrics and a second layer, and the composite may then be laminated together under heat and pressure.

It should be mentioned that a three layer lamination represents a minimum structure and that laminations containing a plurality of polymeric linear terephthalate ester structures, e.g., films and fabrics, and a multiplicity of second layers, e.g., metal sheets, glass, paper, wood, etc., are within the scope of this invention.

In general, the polymethylene isophthalate, e.g., polyethylene isophthalate, and polymethylene hexahydro-terephthalate, e.g., polyethylene hexahydro-terephthalate, adhesives are more soluble in various non-toxic solvents than the copolyester adhesives containing a major quantity of the terephthalate component. Preferably, the copolyester adhesives contain from about 25%–50% of the terephthalate component, i.e., 50% means that there is 50% of the terephthalic acid, or alkyl derivative thereof, present in the initial reactants, based upon the total mols of the two acids. Suitable solvents in which these polyester and copolyester adhesive compositions may be dissolved include ethyl acetate, chloroform, and dioxane.

It should be emphasized that polyethylene isophthalate and ethylene isophthalate/ethylene terephthalate copolyester adhesives are excellent for preparing laminations which are to be subjected to elevated temperatures, i.e., from 100° C. to 125° C. As will be illustrated in examples to be presented hereinafter, laminations prepared with a polyethylene isophthalate or ethylene isophthalate/ethylene terephthalate adhesive layer retain most of their original strength at 125° C. after being aged for 24 hours at 150° C. Hence, the present adhesive compositions containing an isophthalate component are highly useful in preparing structures which are to be subjected to elevated temperatures, for example, for preparing continuous lengths of spiral-wrapped piping prepared from narrow continuous strips of polyethylene terephthalate film, the strips having been coated with an isophthalate/terephthalate copolyester adhesive prior to spiral wrapping. On the other hand, the isophthalate-containing adhesive is highly useful in the preparation of convolute wound piping prepared from wider sheets of polyethylene terephthalate film.

As mentioned hereinbefore, laminations of polyethylene terephthalate with other base materials may be employed in a wide variety of end uses. Depending upon the particular end use, the polyethylene terephthalate film may be as thin as 0.25 mil or as thick as 10 mils or greater, the thicker films, as well as the thinner films, being highly transparent. Included among the general and many specific uses for polyethylene terephthalate film in laminations are the following: laminations with metal foil to give metallic effects in fabrics (metallic yarns); laminations with wood, such as plywood, e.g., for structural parts of furniture and decorative panels; laminations with paper for electrical insulation, milk bottle caps, drum liners, can liners, etc.; millinery applications, for example, in braid form laminated to another film of a different color; laminations containing mica sheets between two sheets of the polymeric film for split mica insulating tapes; laminations with a colored adhesive for window shades; laminations to wood for boat bottoms; containers in the form of laminations to paper, cardboard, or metal sheets; laminations to metal sheets, such as steel, for can linings and container closures in general; laminations to leather for decorative shoe uppers and heel coverings; laminations with other types of polymeric thermoplastic films, such as the vinyl films, e.g., polyvinyl chloride (rigid or flexible) and polyvinylidene chloride, polystyrene, polymethyl methacrylate, cellulose acetate, cellulose acetate butyrate, and various flexible elastomeric films such as butadiene/acrylonitrile copolymer films; laminations with polyethylene film for making bags and packages for frozen juice concentrates and vacuum packaging of luncheon meats, nuts, etc.; laminations of metallized polyethylene terephthalate film to coated fabrics; laminations with filled or unfilled thermosetting polymeric sheets such as those containing phenol-formaldehyde, urea-formaldehyde, melamine-formaldehyde, or laminated structures comprising thermosetting resins, such as "Formica" sheets; laminations to woven fabrics for conveyor belts or power transmitting belts; laminations of polyethylene terephthalate film to itself or to fabrics or leather for fabrication of men's and women's belts and suspenders; laminations of polyethylene terephthalate to itself or to fabrics for trampolines; laminations to asbestos paper for slot liner insulation in motors; laminations with various thermal insulating material such as glass fiber mats or cork sheets (in this capacity, the polyethylene terephthalate film acts as additional thermal insulation and/or a protective covering); laminations with acoustic tile, the film acting as an additional sound insulating layer and/or protective and/or decorative surface for the tile; laminations with metal sheets, e.g., auto bodies, wherein the film to metal lamination may be stamped into various shapes, the film acting as a protective surface; laminations to blocks or sheets of cellular materials, such as cellular cellulose acetate and cellular polystyrene, for use in aircraft construction and sound and therma insulation; laminations to glass containers and to sheets of glass to prevent shattering; laminations to concrete, cement blocks or cinder blocks for tank linings or for moistureproofing building structures; laminations with fibrous sheets for floor coverings, the film having a reverse printed decorative design; and a wide variety of other useful structures wherein the polyethylene terephthalate film is laminated to one or more layers of other materials or other layers of polyethylene terephthalate film. In any of these laminations, the adhesive layer may be colored with dyes or pigments to obtain a decorative effect.

The following examples will serve to illustrate specific embodiments of the present invention:

In the tables of examples presented hereinafter, the following abbreviations will be used:

2GI—polyethylene isophthalate
2GHT—polyethylene hexahydro-terephthalate
2GT/2GI—copolyester of ethylene terephthalate/ethylene isophthalate
2GT/2GHT—copolyester of ethylene terephthalate/ethylene hexahydro-terephthalate In the examples to be summarized in Tables I–III, inclusive, the test laminations were 1" in width. These laminations were prepared either (1) by inserting a homogeneous film of the present copolyester adhesives (the adhesive layer) between a layer of polyethylene terephthalate film and a second layer, or (2) applying the copolyester adhesive in the form of a film upon the polyethylene terephthalate film layer or the second layer or both from a solution of the copolyester adhesive in a solvent, at least a substantail portion of the solvent being evolved prior to pressing the composite. The composite of polyethylene terephthalate film/polyester adhesive layer/second layer was pressed under conditions of elevated temperatures and pressures to form a strong bond between layers. The polyethylene terephthalate film layer was about 3 mils in thickness, and the film had been stretched in two directions (to an extent equal to about 3 times its original dimensions in both directions) and heat-set under tension at about 200° C. When a homogeneous preformed layer of a copolyester adhesive was employed, the preformed film was about 1 mil in thickness, and a film of about the same thickness (although considerably thinner layers may be used) was cast upon one layer of the composite when the adhesive layer was cast from solution. The temperature and pressure at which each of the laminations was prepared are given in the accompanying tables. In cases where the pressing or lamination conditions are not given, it should be understood that the initial composites to be laminated were preheated for amout 1½ minutes at 150° C. and were then subjected to a pressure of about 3,000 pounds per square inch for an additional one minute at the same temperature. It will be noted in the tables that the strength of the adhesive bond between the polyethylene terephthalate film layer and second layer was measured at room temperature without substantial aging of the lamination, and at room temperature and at 125° C. after aging the lamination for 24 hours at 150° C. Aging at 150° C. was carried out by simply hanging the test samples in an air oven for 24 hours.

The strengths of the adhesive bonds were tested at room temperature and at 125° C. in an Instron tensile tester. In this test, one end of the laminated structure (1" in width) was pulled apart, one portion of the end being placed in one jaw of a tensile tester and the other in the second jaw. The jaws of the tester were then pulled apart and the lamination was peeled. Since the jaws pulled the bond from the same end, the resultant values recorded in the following tables represent the maximum value obtained at a line transverse to the axis of tension.

In Table I the second layer is polyethylene terephthalate film, and the examples illustrate lamination of film to film. Other thermoplastic films, such as polyethylene film and vinyl films (polyvinyl chloride) may be laminated to polyethylene terephthalate film under the same conditions given in Table I. In Table II the second layer is different, and the nature of the second layer is indicated in the table. Although Table II summarizes the conditions under which paper, metals and glass may be laminated to polyethylene terephthalate film, the same conditions may be used to laminate the film to natural and synthetic fabrics.

Table III contains data which illustrate the hydrolytic stability of the laminations. Hydrolytic aging was conducted by inserting a section of the bonded film in a pressure vessel and heating for 30 minutes after 15 pounds of pressure was reached. This represented a temperature of about 120° C. Laminations subjected to this aging are summarized under the column titled "Steam treated."

Although the examples summarized in the following tables illustrate the use of polyethylene isophthalate, polyethylene hexahydro-terephthalate, ethylene isophthalate/ethylene terephthalate copolyester, and ethylene hexahydroterephthalate/ethylene terephthalate copolyester as the adhesive layers, it should be emphasized that substantially the same results can be obtained by using adhesive layers of a copolyester of ethylene isophthalate/ethylene hexahydroterephthalate or a copolyester of ethylene isophthalate/ethylene hexahydro-terephthalate/ethylene terephthalate. In general, the amount of ethylene isophthalate in the copolyester determines the properties of the adhesive insofar as the bond strength at elevated temperatures is concerned.

TABLE I
*Laminations of polyethylene terephthalate film [1] to itself*

| Example | Polyester Adhesive Layer [2] | Lamination Conditions | | | Peel Strength, Lbs./1" Wide Sample | | |
|---|---|---|---|---|---|---|---|
| | | Temp., °C. | Pressure (pounds) | Time (min.) | Room Temp. | Aged 24 hrs. @ 150° C. | |
| | | | | | | Room Temp. | 125° C. |
| 1 | 2 GHT | 125 | 1,000 | 1 | 3.8 | 3.0 | |
| 2 | 2 GHT | 150 | 5,000 | 1 | 10.0 | 14.0 | 0.0 |
| 3 | 2 GT/2 GHT 25/75 | 125 | 1,000 | 1 | 3.0 | 1.4 | |
| 4 | 2 GT/2 GHT 50/50 | 145 | 1,000 | 1 | 6.0 | 0.2 | |
| 5 | 2 GT/2 GHT 50/50 | 150 | 5,000 | 1 | 2.4 | 0.2 | 0.0 |
| 6 | 2 GHT (20% in ethyl acetate) | 150 | 3,000 | 1 | 0.6 | 1.5 | [3]<0.05 |
| 7 | 2 GHT (20% in chloroform) | 150 | 3,000 | 1 | 5.0 | 3.5 | <0.05 |
| 8 | 2 GT/2 GHT 25/75 (20% in ethyl acetate) | 150 | 3,000 | 1 | 1.8 | 2.1 | <0.05 |
| 9 | 2 GT/2 GHT 25/75 (20% in chloroform) | 100 | 3,000 | 1 | 1.9 | 2.3 | <0.05 |
| 10 | 2 GT/2 GHT 25/75 (20% in chloroform) | 150 | 3,000 | 1 | 2.3 | 2.3 | <0.05 |
| 11 | 2 GT/2 GHT 50/50 (20% in chloroform) | 100 | 3,000 | 1 | 5.7 | 0.1 | <0.05 |
| 12 | 2 GT/2 GHT 50/50 (20% in chloroform) | 150 | 3,000 | 1 | 3.8 | 1.1 | 0.1 |
| 13 | 2 GI | 147 | 1,000 | 1 | 2.2 | 6.0 | |
| 14 | 2 GI | 150 | 5,000 | 1 | 3.2 | 3.5 | 2.7 |
| 15 | 2 GT/2 GI 30/70 | 150 | 5,000 | 1 | 3.4 | 2.1 | 3.0 |
| 16 | 2 GT/2 GI 50/50 | 135 | 1,000 | 1 | 1.4 | 3.2 | |
| 17 | 2 GT/2 GI 50/50 | 145 | 1,000 | 1 | 5.2 | 6.4 | |
| 18 | 2 GT/2 GI 50/50 | 150 | 50 | 1 | 1.6 | 1.4 | 1.7 |
| 19 | 2 GT/2 GI 50/50 | 150 | 250 | 1 | 1.6 | 2.6 | 1.7 |
| 20 | 2 GT/2 GI 50/50 | 150 | 2,500 | 1 | 2.4 | 1.3 | 1.0 |
| 21 | 2 GT/2 GI 50/50 | 150 | 5,000 | 1 | 3.0 | 3.3 | 1.0 |
| 22 | 2 GT/2 GI 60/40 | 150 | 5,000 | 1 | 5.6 | 3.0 | 0.6 |
| 23 | 2 GT/2 GI 70/30 | 170 | 5,000 | 1 | 4.4 | 3.8 | 2.1 |

[1] Two-way stretched heat-set film.
[2] Solvent is specified if used; otherwise, layer was in the form of a homogeneous film (1 mil).
[3] Less than 0.05.

TABLE II
*Laminations of polyethylene terephthalate film [1] to a different second layer*

| Example | Polyester Adhesive Layer | Second Layer | Peel Strength, Pounds/1" Wide Sample | | |
|---|---|---|---|---|---|
| | | | Room Temp. | After aging 24 hrs. @ 150° C. | |
| | | | | Room Temp. | 125° C. |
| 24 | 2 GT/2 GI 50/50 | Kraft Paper | 2.0 | 2.4 | 1.9 |
| 25 | 2 GT/2 GI 50/50 | Glass | 2.3 | 3.2 | 2.7 |
| 26 | 2 GT/2 GI 50/50 | Aluminum | 0.4 | 0.9 | 6.9 |
| 27 | 2 GT/2 GI 50/50 | Iron | 8.9 | 4.7 | 4.0 |
| 28 | 2 GT/2 GI 50/50 | Copper | 0.5 | 0.7 | 11.6 |
| 29 | 2 GT/2 GI 50/50 | Bronze | 0.6 | 4.4 | 5.7 |
| 30 | 2 GT/2 GI 50/50 | Stainless Steel | 0.2 | 2.1 | 6.8 |
| 31 | 2 GT/2 GI 50/50 | Tin | 1.3 | 0.25 | 0.25 |
| 32 | 2 GHT | Paper | 3.1 | <0.1 | |
| 33 | 2 GHT | Glass | 4.8 | 6.2 | 0.3 |
| 34 | 2 GHT | Aluminum | 7.0 | 8.0 | 0.15 |
| 35 | 2 GHT | Iron | 6.2 | 8.8 | <0.1 |
| 36 | 2 GHT | Copper | 11.5 | 3.1 | 0.3 |
| 37 | 2 GHT | Bronze | 4.4 | 9.0 | <0.1 |
| 38 | 2 GHT | Stainless Steel | 1.0 | 5.2 | 0.1 |

[1] Two-way stretched heat-set film (3 mils in thickness).

TABLE III
*Hydrolytic stability of laminations of polyethylene terephthalate film [1] to itself*

| Example | Polyester Adhesive Layer | Lamination Conditions | | | Peel Strength Pounds/1" Wide Sample | | | | | |
|---|---|---|---|---|---|---|---|---|---|---|
| | | | | | Room Temperature | | Aged 24 hours at 150° C. | | | |
| | | | | | | | Room Temperature | | At 125° C. | |
| | | Temp., °C. | Pressure (Pounds) | Time (Min.) | Untreated | Steam Treated | Untreated | Steam Treated | Untreated | Steam Treated |
| 39 | 2 GT/2 GI 50/50 (20% in chloroform) | 150 | 10,000 | 1 | 1.7 | 0.8 | 2.0 | 0.5 | | |
| 40 | 2 GT/2 GI 75/25 | 170 | 5,000 | 1 | 4.0 | 3.7 | 2.0 | 2.8 | 1.5 | 1.9 |
| 41 | 2 GT/2 GI 50/50 | 70 | 5,000 | 1 | 1.7 | 0.9 | 1.6 | 1.8 | 0.8 | 1.7 |

[1] Two-way stretched heat-set film (3 mils in thickness).

I claim:

1. A lamination comprising a layer of a polymeric linear terephthalate ester structure and a second layer, said layers being adhered together with an intermediate adhesive layer, said adhesive layer consisting of a polyester of a polymethylene glycol having from 2–10 carbon atoms per molecule with a dicarboxylic acid from the group consisting of isophthalic acid, hexahydro-terephthalic acid, a mixture of terephthalic and isophthalic acid, a mixture of terephthalic acid and hexahydro-terephthalic acid, a mixture of isophthalic acid and hexahydro-terephthalic acid, and a mixture of isophthalic acid, hexahydro-terephthalic acid and terephthalic acid.

2. The product of claim 1, wherein the polymeric linear terephthalate ester structure is a film.

3. The product of claim 1, wherein the second layer is a polymeric linear terephthalate ester film.

4. The product of claim 1 wherein the second layer is a metal.

5. The product of claim 1 wherein the second layer is paper.

6. The product of claim 1 wherein the second layer is fabric.

7. The product of claim 1 wherein the second layer is another thermoplastic film.

8. A method of preparing a lamination comprising adhering the surface of a layer of a polymeric linear terephthalic ester structure to an adhesive layer, said adhesive layer consisting of a polyester of a polymethylene glycol having from 2–10 carbon atoms per molecule with a dicarboxylic acid from the group consisting of isophthalic acid, hexahydro-terephthalic acid, a mixture of terephthalic acid and isophthalic acid, and a mixture of terephthalic acid and hexahydroterephthalic acid, a mixture of isophthalic acid and hexahydro-terephthalic acid, and a mixture of isophthalic acid, hexahydro-terephthalic acid and terephthalic acid, and thereafter adhering said adhesive layer to a second layer.

References Cited in the file of this patent

UNITED STATES PATENTS

| | | |
|---|---|---|
| 2,514,141 | Phillips | July 4, 1950 |
| 2,594,144 | Flory | Apr. 22, 1952 |
| 2,623,034 | Flory | Dec. 23, 1952 |
| 2,650,213 | Hofrichter | Aug. 25, 1953 |
| 2,673,826 | Ness | Mar. 30, 1954 |
| 2,676,128 | Piccard | Apr. 20, 1954 |
| 2,679,969 | Richter | June 1, 1954 |
| 2,729,619 | Sullivan | Jan. 3, 1956 |
| 2,765,250 | Williams | Oct. 2, 1956 |
| 2,765,251 | Williams | Oct. 2, 1956 |